(12) United States Patent
Cheng

(10) Patent No.: US 7,097,475 B2
(45) Date of Patent: Aug. 29, 2006

(54) ELECTRICAL CARD CONNECTOR WITH DOOR

(75) Inventor: Yung Chang Cheng, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/001,874

(22) Filed: Dec. 1, 2004

(65) Prior Publication Data

US 2005/0142913 A1    Jun. 30, 2005

(30) Foreign Application Priority Data

Dec. 26, 2003   (TW) .............................. 92222754 U

(51) Int. Cl.
*H01R 13/44* (2006.01)
(52) U.S. Cl. ...................................... 439/138
(58) Field of Classification Search ................ 439/138, 439/142, 136
See application file for complete search history.

(56) References Cited

U.S. PATENT DOCUMENTS

| 5,483,419 | A | 1/1996 | Kaczeus, Sr. et al. |
| 6,120,322 | A | 9/2000 | Ho et al. |
| 6,269,005 | B1 | 7/2001 | Tung et al. |
| 6,558,175 | B1 | 5/2003 | Yu |
| 2001/0049214 | A1 * | 12/2001 | Billman ...................... 439/138 |

* cited by examiner

*Primary Examiner*—Javaid H. Nasri
(74) *Attorney, Agent, or Firm*—Wei Te Chung

(57) ABSTRACT

An electrical card connector (100) for connecting with an electrical card includes an insulative housing (10), a plurality of contacts (20), a front cover (30), a rear cover (40) and a door (50). The rear cover comprises an insertion space and a spring tab (422) extending into the insertion space. The door includes a door panel (52) and a cam (542). The door can move from an open position to a closed position by the actuation of the spring tab to shield the insertion space of the rear cover.

8 Claims, 3 Drawing Sheets

ELECTRICAL CARD CONNECTOR WITH DOOR

BACKGROUND OF THE INVENTION

1. Field of the Invention

The present invention generally relates to an electrical card connector, and more particularly to an electrical card connector with a door for dust-proof.

2. Description of Related Art

With the development of portable computer, the dimension of the portable computer gets more and more smaller so that the computer need more memory cards to meet the requirement. The electrical card connectors are widely used in the portable computer. However, the portable computer is often used in open air, the dust may enter into the interior of the portable computer through the opening of electrical card connector, too much dust influences the work of the portable computer, and even shortens the life of the portable computer. Accordingly, the electrical card connector always has a door for preventing the dust from entering into the interior of the portable computer.

U.S. Pat. No. 6,120,322 discloses an electrical card connector device with a dustproof device. The electrical card connector device has a casing, and the casing defines an insertion port through which an electrical card is received into the electrical card connector and a pair of front extensions with pivot holes. A door for blocking the insertion port has a door panel with a pair of pivot pins rotatablely received in the pivot holes and a pair of torsional springs. Each torsional spring has a first end supported by the pivot pin and a second hooked end engaging with the pivot hole. The torsional springs can make the door panel block the insertion port and prevent dust from entering into the interior of the notebook when no card is inserted into the electrical card connector. However, the assembly of the electrical card connector is difficult due to so small torsional springs, Furthermore, if one of torsional springs is expired, the door will lose the dustproof function.

Hence, it is desired to provide an electrical card connector with an improved dustproof device to overcome the aforementioned disadvantages of the prior art.

SUMMARY OF THE INVENTION

A main object of the present invention is to provide an electrical card connector having an improved dustproof device.

In order to achieve the object set forth, an electrical card connector in accordance with the present invention comprises an insulative housing, a plurality of contacts, a cover and a door moveably assembled to the cover. The cover comprises an insertion space and a spring tab extending into the insertion space. The door can move from an open position to a closed position by the actuation of the spring tab to shield the insertion space of the cover.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
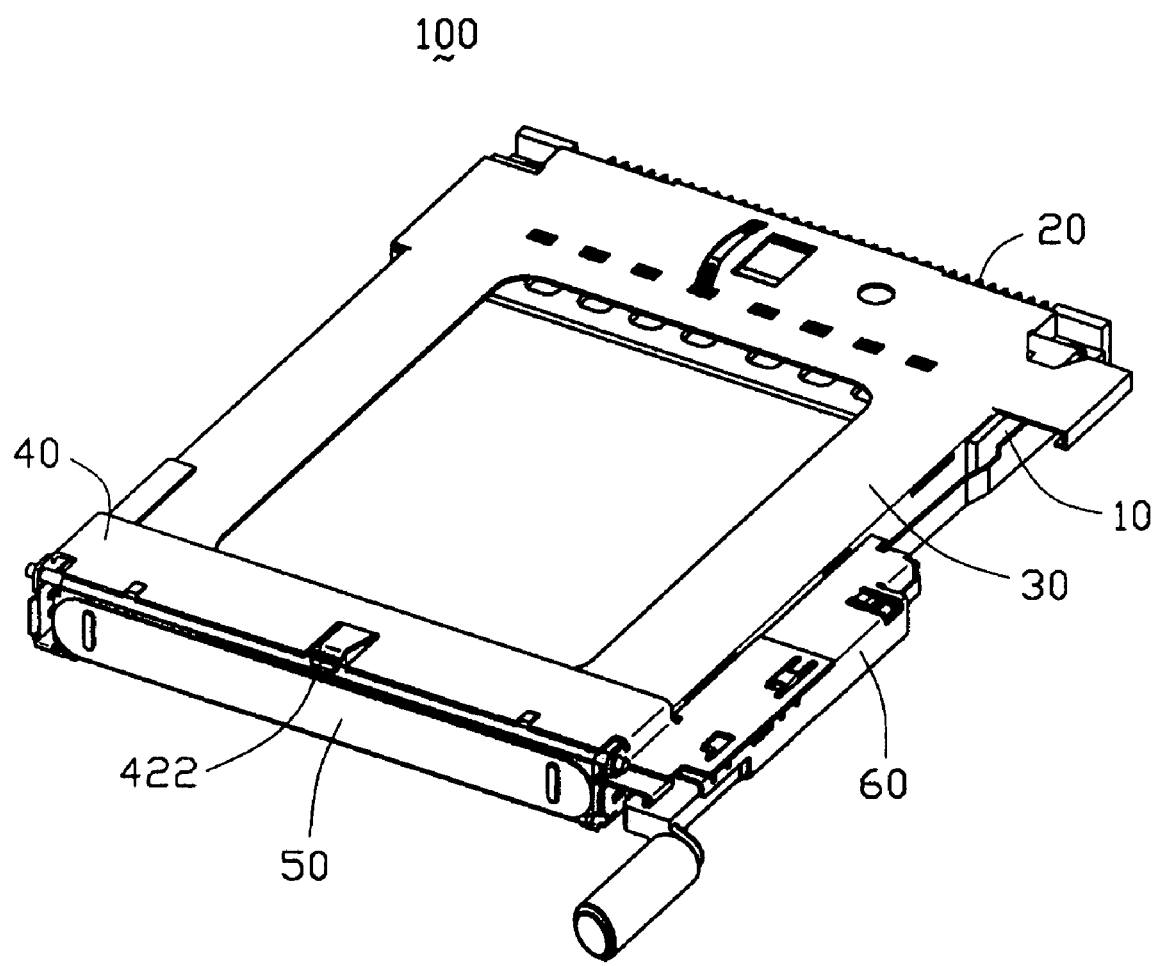
FIG. 1 is an assembled view of an electrical card connector in accordance with the present invention.

Referring to FIG. 1, an electrical card connector 100 in accordance with the present invention comprises an insulative housing 10, a plurality of contacts 20 retained in the insulative housing 10, a front cover 30 attached to the insulative housing 10, a rear cover 40 attached to the rear end of the front cove, a door 50 and an ejection mechanism 60.

Figure 2:
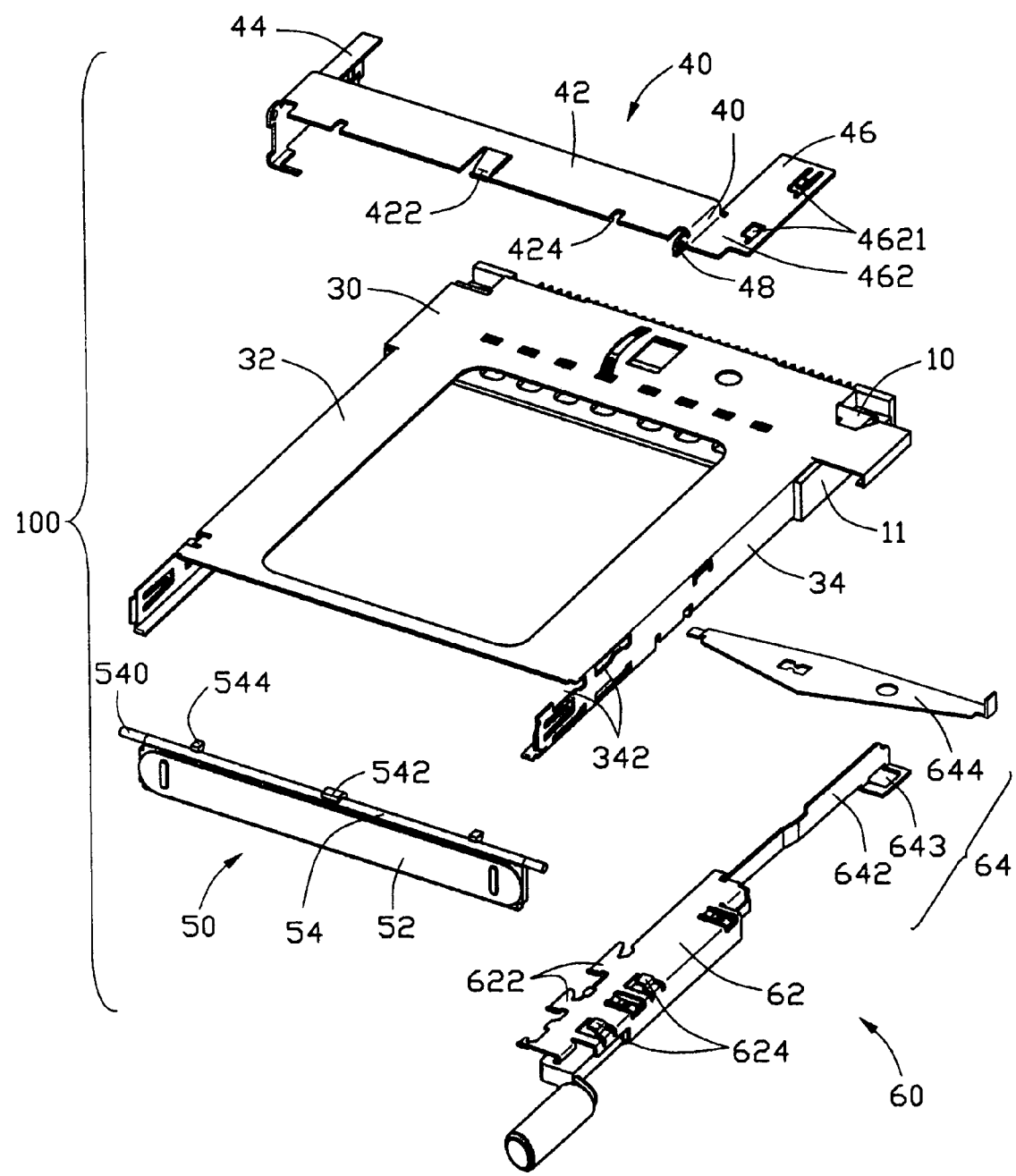
FIG. 2 is a partially exploded, perspective view of the electrical card connector of FIG. 1.
Figure 3:
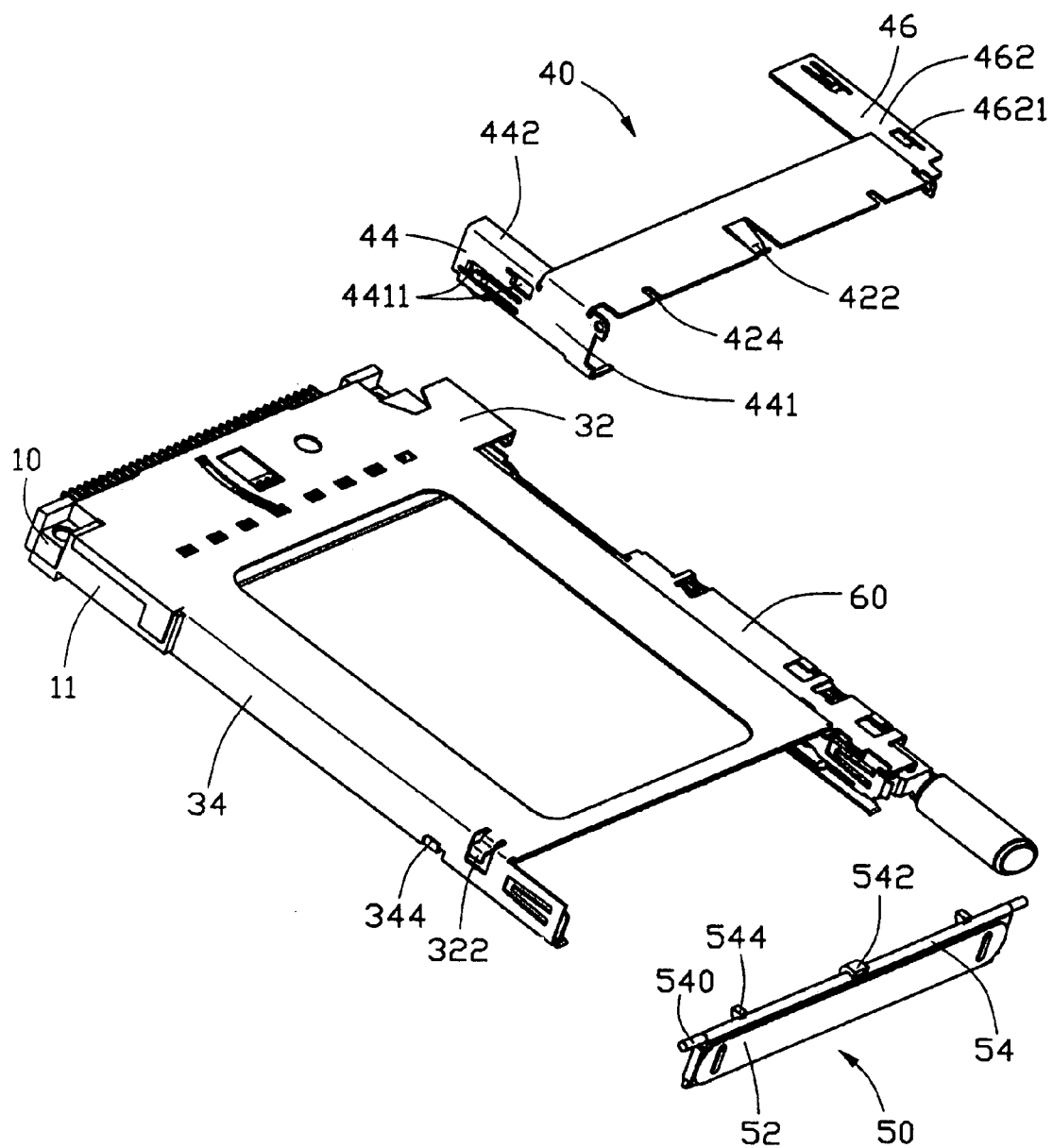
FIG. 3 is a view similar to FIG. 2, but taken from a different aspect.

Referring to FIG. 1 in conjunction with FIGS. 2–3, the insulative housing 10 is a shape of block, comprises a top face (not labeled), a bottom face (not shown) opposite to the top face, a pair of side faces (not labeled) connecting the top and bottom faces. A pair of guiding walls 11 extend rearwardly from the side faces and form a receiving space (not shown) for accommodating an electrical card therebetween.

The front cover 30 comprises a main portion 32 with a latching tab 322 extending outwardly thereof and a first and a second sidewalls 34 extending downwardly from the main portion 32. The first sidewall 34 defines a plurality of latching apertures 342, the second sidewall 34 defines a snap section 344.

The rear cover 40 defines an insertion space, and comprises a main portion 42, a first arm 44 and a second arm 46. The main portion 42 comprises a spring tab 422 with a bending part and a pair of cutouts 424 in a rear edge thereof. The spring tab 422 extends into the insertion space. The first arm 44 comprises a vertical section 441 extending downwardly from one opposite side of the main portion 42 and a horizontal section 422 connecting with the vertical section 441. The vertical section 441 defines a plurality of latching apertures 4411 corresponding to the latching tab 322 and the snap section 344. The second arm 46 comprises a vertical section 461 extending downwardly from another side of the main portion 42 and a horizontal section 462 connecting with the vertical section 461. The horizontal section 462 defines a plurality of latching apertures 4621. The vertical sections 441, 461 define a pivot hole 48 respectively on a rear edge thereof for engaging with the door 50. The horizontal sections 442, 462 are in a same horizontal plane, an accommodating space for retaining the door is defined between the main portion 42 and the vertical sections 441,461.

The door 50 comprises a door panel 52 and a pivot 54 connecting with an upper edge of the door panel 52. The door panel 52 is a rectangle-shaped board. The pivot 54 comprises a pair of pivot pins 540 extending laterally from the opposite ends thereof, a cam 542 and a pair of protrusions 544 protruding upwardly corresponding to the spring tab 422 and the cutouts 424, respectively. Surely, the cam 542 can extend to the upper edge of the door panel 52.

The ejector 60 comprises an actuation section 62 and an ejection section 64. The actuation section 62 defines a plurality of latching section 622 on a side edge for engaging with the corresponding latching apertures 342 on the sidewall 34 of the front cover 30, and a plurality of latching tabs 624 on a top surface thereof for engaging with the latching apertures 4621 of the rear cover 40. The ejection section 64 has a driven member 642 and an ejection rod 644 sandwiched between the insulative housing 10 and the front cover 30. The driven member 642 connects with the actuation section 62 at an end thereof and defines a limit hole 643 on the other end for the ejection rod 644 rotates connecting with the driven member 642. As an operator exerts a force on the actuation section 62, the ejection rod 644 rotates and ejects out of the electronic card received in the electrical card connector 100.

In assembly, the contacts 20 are received in the insulative housing 10 with tail portions (not labeled) thereof extending into the receiving space for electrically connecting with the electrical card. The front cover 30 is assembled on the top face of the insulative housing 10 and the sidewalls 34 are attached to the corresponding guiding walls 11. The rear cover 40 is assembled to the rear end of the front cover 30 by means of the latching tab 322, the snap section 344 engaging with the latching apertures 4411. Such the insulative housing 10, the front cover 30 and the rear cover 40 define a space for accommodating the electrical card (not shown) and a rectangle insertion port communicating with the space for the insertion/withdrawal of the electrical card into/out. The ejection rod 644 of the ejection 60 sandwiched between the insulative housing 10 and the front cover 30, and the ejection 60 is assembled to the front cover 30 and the rear cover 40 by means of the latching apertures 342, 4621, the latching sections 622 and the latching tabs 624. The door 50 is rotatablely assembled to the rear cover 40 with the pivot pins 540 received in the pivot holes 48, the bending part of the spring tab 422 of the rear cover 40 presses on the cam 542 to make the door 50 closed and shield the insertion port, the protrusions 544 of the door 50 mate with the cutouts 424 of the rear cover 40 and prevent the door 50 from moving along the extending direction of the pivot pin 540. The door 50 is in a closed position as described above.

When the electrical card is inserted into the electrical card connector 100 through the insertion port, the door 50 rotates inwardly around the axis of the pivot pins 540 until to an open position due to the force of insertion. In the open position, the door 50 retains in the accommodating space of the rear cover 40, the bending part of the spring tab 422 presses on the door panel 52 with increased resilience.

After the electrical card is withdrew out from the electrical card connector 100, the door 50 is free from the external force and is activated by the resilience of the spring tab 422 and rotate from the open position to the closed poison and shield the insertion port.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector comprising:
    an insulative housing;
    a plurality of contacts received in the insulative housing;
    a cover comprising an insertion space, a front cover attached to the insulative housing and a rear cover discrete from and assembled to the rear end of the front cover in a lengthwise direction, the rear cover having a spring tab extending into the insertion space; and
    a door movably assembled to the cover, the door being moveable from an open position to a closed position by the actuation of the spring tab to shield the insertion space of the cover; wherein
    the door comprises a door panel and a pivot connecting with an upper edge of the door panel, a cam protrudes upwardly corresponding to the spring tab; wherein
    the door panel comprises a rectangle-shaped board; wherein
    the rear cover comprises a main portion, a first arm and a second arm; wherein
    the first and second arms comprise a vertical section and a horizontal section respectively; wherein
    the front cover comprises a main portion and opposite sidewalls having snap sections, the rear cover defines a plurality of latching apertures on one horizontal section thereof for mating with the snap sections.

2. The electrical card connector as claimed in claim 1, wherein the rear cover comprises a pair of cutouts in a rear edge thereof, and the door comprises a pair of protrusions protruding upwardly for mating with the cutouts respectively.

3. The electrical card connector as claimed in claim 1, wherein the spring tab extends from the main portion and comprises a bending portion.

4. The electrical card connector as claimed in claim 1, wherein the vertical sections define a pivot hole respectively on a rear edge thereof, and the pivot of the door comprises a pair of pivot pins extending from opposite ends for being rotatablely received in the pivot holes.

5. The electrical card connector as claimed in claim 1, wherein the horizontal sections are in a same horizontal plane, an accommodating space for retaining the door is defined between the main portion and the vertical sections.

6. The electrical card connector as claimed in claim 1, further comprising an ejection being assembled to the front and rear cover, and having an actuation section and an ejection section.

7. The electrical card connector as claimed in claim 6, wherein the ejector section comprises a driven member and an ejection rod sandwiched between the insulative housing and the front cover.

8. The electrical card connector as claimed in claim 7, wherein the front cover defines a plurality of latching apertures on one sidewall thereof, and the actuation section of the ejection comprises a plurality of latching member for mating with the latching apertures of the front and rear covers.

* * * * *